(12) United States Patent
Liu et al.

(10) Patent No.: US 8,035,711 B2
(45) Date of Patent: Oct. 11, 2011

(54) SUB-PIXEL ARRAY OPTICAL SENSOR

(75) Inventors: Li Liu, Cortland, NY (US); Jeffrey Jon Zarnowski, McGraw, NY (US); Ketan Vrajlal Karia, Cortland, NY (US); Thomas Poonnen, Cortland, NY (US); Michael Eugene Joyner, McGraw, NY (US)

(73) Assignee: Panavision Imaging, LLC, Homer, NY (US)

( * ) Notice: Subject to any disclaimer, the term of this patent is extended or adjusted under 35 U.S.C. 154(b) by 602 days.

(21) Appl. No.: 12/125,466

(22) Filed: May 22, 2008

(65) Prior Publication Data

US 2009/0290043 A1    Nov. 26, 2009

(51) Int. Cl.
*H04N 9/083* (2006.01)
(52) U.S. Cl. ........................................................ 348/277
(58) Field of Classification Search .................. 348/276, 348/277, 278, 279, 280
See application file for complete search history.

(56) References Cited

U.S. PATENT DOCUMENTS

| | | |
|---|---|---|
| 5,949,483 A | 9/1999 | Fossum et al. |
| 6,018,365 A | 1/2000 | Merrill |
| 6,084,229 A | 7/2000 | Pace et al. |
| 6,580,063 B1 | 6/2003 | Okamoto |
| 6,633,028 B2 | 10/2003 | Fowler |
| 6,861,635 B1 | 3/2005 | Phan |
| 6,882,364 B1 | 4/2005 | Inuiya et al. |
| 6,885,399 B1 | 4/2005 | Kawashiri |
| 7,045,758 B2 | 5/2006 | Zarnowski et al. |
| 7,057,150 B2 | 6/2006 | Zarnowski et al. |
| 7,133,069 B2 | 11/2006 | Wallach et al. |
| 7,190,402 B2 | 3/2007 | Ban et al. |
| 7,202,463 B1 | 4/2007 | Cox |
| 7,259,412 B2 | 8/2007 | Yamaguchi et al. |
| 7,518,646 B2 | 4/2009 | Zarnowski et al. |
| 7,671,316 B2 * | 3/2010 | Kanai et al. ................. 250/208.1 |
| 7,830,430 B2 * | 11/2010 | Adams et al. .................. 348/277 |
| 7,834,927 B2 | 11/2010 | Glenn |
| 7,839,437 B2 * | 11/2010 | Kasai et al. .................... 348/238 |

(Continued)

OTHER PUBLICATIONS

Panavision Imaging, LLC. (2004). "QuadHD™: High Resolution Color/Monochrome Video Sensor Data Sheet," Image Sensor Products, PDS0026 Rev. E.doc, 26 pages.

(Continued)

*Primary Examiner* — David Ometz
*Assistant Examiner* — Dillon Durnford Geszvain
(74) *Attorney, Agent, or Firm* — Connolly Bove Lodge & Hutz LLP

(57) ABSTRACT

Improving the dynamic range of captured images is disclosed by using sub-pixel arrays to capture light at different exposures and generate color pixel outputs for an image in a single frame. Each sub-pixel array can include multiple sub-pixels. The sub-pixels that make up a sub-pixel array can include red (R) sub-pixels, green (G) sub-pixels, blue (B) sub-pixels, and in some embodiments, clear sub-pixels. Those sub-pixel arrays having clear sub-pixels effectively have a higher exposure level and can capture low-light scenes (for dark areas) better than those sub-pixel arrays without clear sub-pixels. Each sub-pixel array can produce a color pixel output that is a combination of the outputs of the sub-pixels in the sub-pixel array. Each sub-pixel in a sub-pixel array can have the same exposure time, or in some embodiments, individual sub-pixels within a sub-pixel array can have different exposure times to improve the overall dynamic range even more.

21 Claims, 3 Drawing Sheets

U.S. PATENT DOCUMENTS

| | | |
|---|---|---|
| 2007/0024931 A1* | 2/2007 | Compton et al. ............. 358/512 |
| 2007/0024934 A1 | 2/2007 | Andams et al. |
| 2008/0018765 A1 | 1/2008 | Choi et al. |
| 2008/0128598 A1 | 6/2008 | Kanai et al. |
| 2009/0290052 A1 | 11/2009 | Liu et al. |

OTHER PUBLICATIONS

Panavision Imaging, LLC. (May 23, 2007). "MDIC-2.0 XtremePix™ 2.0 MP Mobile Digital Imaging Chip," Image Sensor Products, MDIC-2.0, two pages.

Panavision Imaging, LLC. (2008). "DLIS-2K XtremePix™ : Ultra-Configurable Monochrome Linear Sensor, DLIS-2K Imager" PDS0038 Rev. G.doc, 30 pages.

Panavision Imaging, LLC. (2008). "DLIS-4K XtremePix™: Ultra-Configurable Monochrome Linear Sensor, DLIS-4K Imager" PDS0037 Rev. E, 30 pages.

Panavision Imaging, LLC. (2008). "DYNAMAX_35™ Ultra: Ultra-High Resolution Color.Monochrome Video Sensor," two pages.

Panavision Imaging, LLC. (2008). "RPLIS-2048-EX: 2048×1 Linear Image Sensor Datasheet," Image Sensor Products, PDS0039 Rev. F, 17 pages.

Panavision Imaging, LLC. (Apr. 14, 2009). "High Performance Linear Image Sensors: ELIS-1024 Imager," Image Sensor Products, PDS0004 Rev. J, 13 pages.

Panavision Imaging, LLC. (Apr. 14, 2009). "LIS-1024: High Performance Linear CMOS Image Sensor," Image Sensor Products, PDS0001 Rev. R, 13 pages.

Panavision Imaging, LLC. (Apr. 14, 2009). "SLIS-2048: High Speed 2048×1 Line Scan Image Sensor," Image Sensor Products, PDS0005 Rev. I, 14 pages.

Panavision Imaging, LLC. (May 14, 2009). "LIS-500: Line Scan Image Sensor," Image Sensor Products, LIS-500 Brief, five pages.

Panavision Imaging, LLC. (Sep. 15, 2009). "Line Scan Image Sensor Demonstration Kit for: LIS-1024, LIS-500, RPLIS-2048, ELIS-1024, DLIS-2K/4K and SLIS-2048," Image Sensor Products, Line Scan Demo Kit Brief, three pages.

Panavision Imaging, LLC. (2010). "Active Column vs. Active Pixel," located at <http:www.panavisionimaging.com/PDF/pviacsvaps.pdf>, last visited Apr. 16, 2010, three pages.

Panavision Imaging, LLC. (2010). "Linear Array Sensors Product Selection Guide," located at <http:www.panavisionimaging.com/PDF/LinearProductMatrixSelectionGuide061609>, last visited Apr. 16, 2010, one page.

Glenn, W.E. (Jul./Aug. 2002). "A 1920×1080 60P System Compatible with a 1920×1080 30I Format," *SMPTE Journal* pp. 343-346.

* cited by examiner

SUB-PIXEL ARRAY OPTICAL SENSOR

FIELD OF THE INVENTION

Embodiments of the invention relate to digital color image sensors, and more particularly, to an enhanced dynamic range sensor that utilizes arrays of sub-pixels to generate the data for color pixels in an image.

BACKGROUND OF THE INVENTION

Digital image capture devices are becoming ubiquitous in today's society. High-definition video cameras for the motion picture industry, image scanners, professional still photography cameras, consumer-level "point-and-shoot" cameras and hand-held personal devices such as mobile telephones are just a few examples of modern devices that commonly utilize digital color image sensors to capture images. Regardless of the image capture device, in most instances the most desirable images are produced when the sensors in those devices can capture fine details in both the bright and dark areas of a scene or image to be captured. In other words, the quality of the captured image is often a function of the amount of detail at various light levels that can be captured. For example, a sensor capable of generating an image with fine detail in both the bright and dark areas of the scene is generally considered superior to a sensor that captures fine detail in either bright or dark areas, but not both simultaneously.

Thus, higher dynamic range becomes an important concern for digital imaging performance. For sensors with a linear response, their dynamic range can be defined as the ratio of their output's saturation level to the noise floor at dark. This definition is not suitable for sensors without a linear response. For all image sensors with or without linear response, the dynamic range can be measured by the ratio of the maximum detectable light level to the minimum detectable light level. Prior dynamic range extension methods fall into two general categories: improvement of sensor structure, a revision of the capturing procedure, or a combination of the two.

Structure approaches can be implemented at the pixel level or at the sensor array level. For example, U.S. Pat. No. 7,259,412 introduces a HDR transistor in a pixel cell. A revised sensor array with additional high voltage supply and voltage level shifter circuits is proposed in U.S. Pat. No. 6,861,635. The typical method for the second category is to use different exposures over multiple frames (e.g. long and short exposures in two different frames to capture both dark and bright areas of the image), and then combine the results from the two frames. The details are described in U.S. Pat. No. 7,133,069 and U.S. Pat. No. 7,190,402. In U.S. Pat. No. 7,202,463 and U.S. Pat. No. 6,018,365, different approaches with combination of two categories are introduced.

SUMMARY OF THE INVENTION

Embodiments of the invention improve the dynamic range of captured images by using sub-pixel arrays to capture light at different exposures and generate color pixel outputs for an image in a single frame. The sub-pixel arrays utilize supersampling and are generally directed towards high-end, high resolution sensors and cameras. Each sub-pixel array can include multiple sub-pixels. The sub-pixels that make up a sub-pixel array can include red (R) sub-pixels, green (G) sub-pixels, blue (B) sub-pixels, and in some embodiments, clear sub-pixels. Because clear sub-pixels capture more light than color pixels, the use of clear sub-pixels can enable the sub-pixel arrays to capture different exposures in a single frame during a single exposure period. Those sub-pixel arrays having clear sub-pixels effectively have a higher exposure level and can capture low-light scenes (for dark areas) better than those sub-pixel arrays without clear sub-pixels. Each sub-pixel array can produce a color pixel output that is a combination of the outputs of the sub-pixels in the sub-pixel array. The sub-pixel array can be oriented diagonally to improve visual resolution and color purity by minimizing color crosstalk. Each sub-pixel in a sub-pixel array can have the same exposure time, or in some embodiments, individual sub-pixels within a sub-pixel array can have different exposure times to improve the overall dynamic range even more.

One exemplary 3×3 sub-pixel array forming a color pixel in a diagonal strip pattern includes multiple R, G and B sub-pixels, each color arranged in a channel. One pixel can includes the three sub-pixels of the same color. Another exemplary diagonal 3×3 sub-pixel array includes one or more clear sub-pixels. To enhance the sensitivity (dynamic range) of the sub-pixel array, one or more of the color sub-pixels can be replaced with clear sub-pixels. Sub-pixel arrays with more than three clear sub-pixels can also be used, although the color performance of the sub-pixel array can be diminished as a higher percentage of clear sub-pixels are used in the array. With more clear sub-pixels, the dynamic range of the sub-pixel array can go up because more light can be detected, but less color information can be obtained. With fewer clear sub-pixels, the dynamic range will be smaller, but more color information can be obtained. A clear sub-pixel can be about six times more sensitive as compared to other colored sub-pixels (i.e. a clear sub-pixel will produce a six times greater voltage than a colored sub-pixel, given the same amount of light). Thus, a clear sub-pixel captures dark images well, but will get overexposed (saturated) at a smaller exposure time than color sub-pixels given the same layout.

Each sub-pixel array can produce a color pixel output that is a combination of the outputs of the sub-pixels in the sub-pixel array. In some embodiments of the invention, all sub-pixels can have the same exposure time, and all sub-pixel outputs can be normalized to the same range (e.g. between [0,1]). The final color pixel output can be the combination of all sub-pixels (each sub-pixel type having different response curves). However, if a higher dynamic range is desired, the exposure time of individual sub-pixels can be varied (e.g. the clear sub-pixel in a sub-pixel array can be exposed for a longer time, while the color sub-pixels can be exposed for a shorter time). In this manner, even darker areas can be captured, while the regular color sub-pixels exposed for a shorter time can capture even brighter areas.

DETAILED DESCRIPTION OF THE PREFERRED EMBODIMENT

Figure 1:
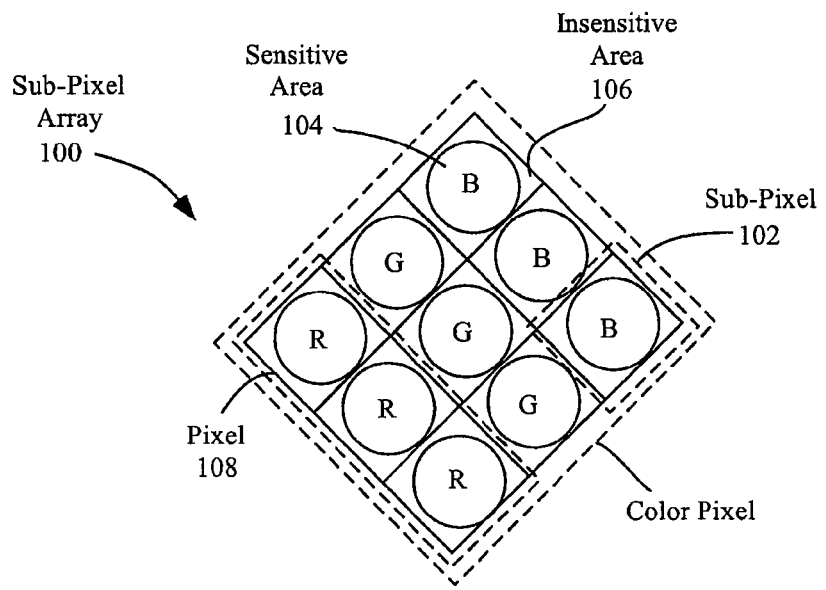
FIG. 1 illustrates an exemplary 3×3 sub-pixel array forming a color pixel in a diagonal strip pattern according to embodiments of the invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention can improve the dynamic range of captured images by using sub-pixel arrays to capture light at different exposures and generate color pixel outputs for an image in a single frame. The sub-pixel arrays utilize supersampling and are generally directed towards high-end, high resolution sensors and cameras. Each sub-pixel array can include multiple sub-pixels. The sub-pixels that make up a sub-pixel array can include red (R) sub-pixels, green (G) sub-pixels, blue (B) sub-pixels, and in some embodiments, clear sub-pixels. Each color sub-pixel can be covered with a micro-lens to increase the fill factors. A clear sub-pixel is a sub-pixel with no color filter covering. Because clear sub-pixels capture more light than color pixels, the use of clear sub-pixels can enable the sub-pixel arrays to capture different exposures in a single frame during a single exposure period. Those sub-pixel arrays having clear sub-pixels effectively have a higher exposure level and can capture low-light scenes (for dark areas) better than those sub-pixel arrays without clear sub-pixels. Each sub-pixel array can produce a color pixel output that is a combination of the outputs of the sub-pixels in the sub-pixel array. The sub-pixel array can be oriented diagonally to improve visual resolution and color purity by minimizing color crosstalk. Each sub-pixel in a sub-pixel array can have the same exposure time, or in some embodiments, individual sub-pixels within a sub-pixel array can have different exposure times to improve the overall dynamic range even more. With embodiments of the invention, the dynamic range can be improved without significant structure changes and processing costs.

Although the sub-pixel arrays according to embodiments of the invention may be described and illustrated herein primarily in terms of high-end, high resolution imagers and cameras, it should be understood that any type of image capture device for which an enhanced dynamic range is desired can utilize the sensor embodiments described herein. Furthermore, although the sub-pixel arrays may be described and illustrated herein in terms of 3×3 arrays of sub-pixels forming strip pixels with sub-pixels having circular sensitive regions, other array sizes and shapes of pixels and sub-pixels can be utilized as well. In addition, although the color sub-pixels in the sub-pixel arrays may be described as containing R, G and B sub-pixels, in other embodiments colors other than R, G, and B can be used, such as the complementary colors cyan, magenta, and yellow, and even different color shades (e.g. two different shades of blue) can be used. It should also be understood that these colors may be described generally as first, second and third colors, with the understanding that these descriptions do not imply a particular order.

FIG. 1 illustrates an exemplary 3×3 sub-pixel array 100 forming a color pixel in a diagonal strip pattern according to embodiments of the invention. Sub-pixel array 100 can include multiple sub-pixels 102. The sub-pixels 102 that make up sub-pixel array 100 can include R, G and B sub-pixels, each color arranged in a channel. The circles can represent valid sensitive areas 104 in the physical structure of each sub-pixel 102, and the gaps 106 between can represent insensitive components such as control gates. In the example of FIG. 1, one pixel 108 includes the three sub-pixels of the same color. Although FIG. 1 illustrates a 3×3 sub-pixel array, in other embodiments the sub-pixel array can be formed from other numbers of sub-pixels, such as a 4×4 sub-pixel array, etc. For the same sub-pixel size, in general the larger the pixel array, the lower the spatial resolution, because each sub-pixel array is bigger and yet ultimately generates only a single color pixel output. Sub-pixel selection can either be pre-determined by design or through software selection for different combinations.

Figures 2A, 2B, 2C:
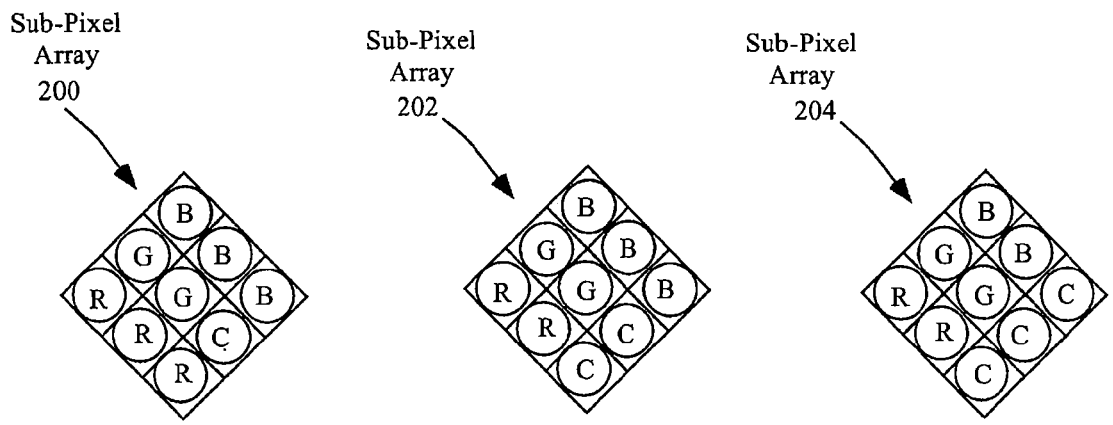
FIGS. 2a, 2b and 2c illustrate exemplary diagonal 3×3 sub-pixel arrays, each sub-pixel array containing one, two and three clear sub-pixels, respectively, according to embodiments of the invention.

FIGS. 2a, 2b and 2c illustrate exemplary diagonal 3×3 sub-pixel arrays 200, 202 and 204 respectively, each sub-pixel array containing one, two and three clear sub-pixels, respectively, according to embodiments of the invention. To enhance the sensitivity (dynamic range) of the sub-pixel array, one or more of the color sub-pixels can be replaced with clear sub-pixels as shown in FIGS. 2a, 2b and 2c. Note that the placement of the clear sub-pixels in FIGS. 2a, 2b and 2c is merely exemplary, and that the clear sub-pixels can be located elsewhere within the sub-pixel arrays. Furthermore, although FIGS. 1, 2a, 2b and 2c show diagonal orientations, orthogonal sub-pixel orientations can also be employed.

Sub-pixel arrays with more than three clear sub-pixels can also be used, although the color performance of the sub-pixel array can be diminished as a higher percentage of clear sub-pixels are used in the array. With more clear sub-pixels, the dynamic range of the sub-pixel array can go up because more light can be detected, but less color information can be obtained. With fewer clear sub-pixels, the dynamic range will be smaller, but more color information can be obtained. Clear sub-pixels can be more sensitive and can capture more light than color sub-pixels given the same exposure time because they do not have a colorant coating (i.e. no color filter), so they can be useful in dark environments. In other words, for a given amount of light, clear sub-pixels produce a greater response, so they can capture dark scenes better than color sub-pixels. For typical R, G and B sub-pixels, the color filters block most of the light in the other two channels (colors) and only about half of the light in the same color channel can be passed. Thus, a clear sub-pixel can be about six times more sensitive as compared to other colored sub-pixels (i.e. a clear sub-pixel will produce a six times greater voltage than a colored sub-pixel, given the same amount of light). Thus, a clear sub-pixel captures dark images well, but will get overexposed (saturated) at a smaller exposure time than color sub-pixels given the same layout.

Figure 3A:
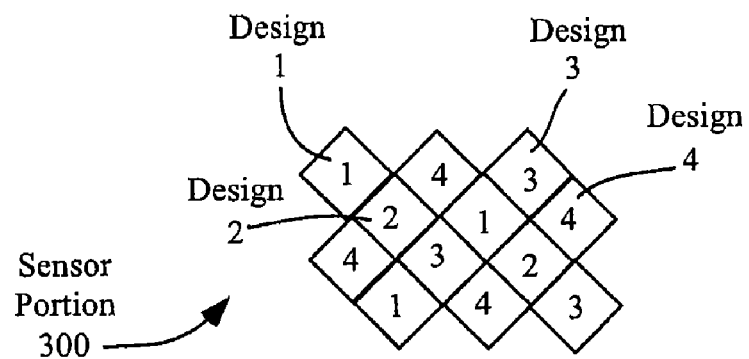
FIG. 3a illustrates an exemplary digital image sensor portion having four repeating sub-pixel array designs designated 1, 2, 3 and 4, each sub-pixel array design having a clear pixel in a different location according to embodiments of the invention.

FIG. 3a illustrates an exemplary sensor portion 300 having four repeating sub-pixel array designs designated 1, 2, 3 and 4, each sub-pixel array design having a clear sub-pixel in a different location according to embodiments of the invention.

Figure 3B:
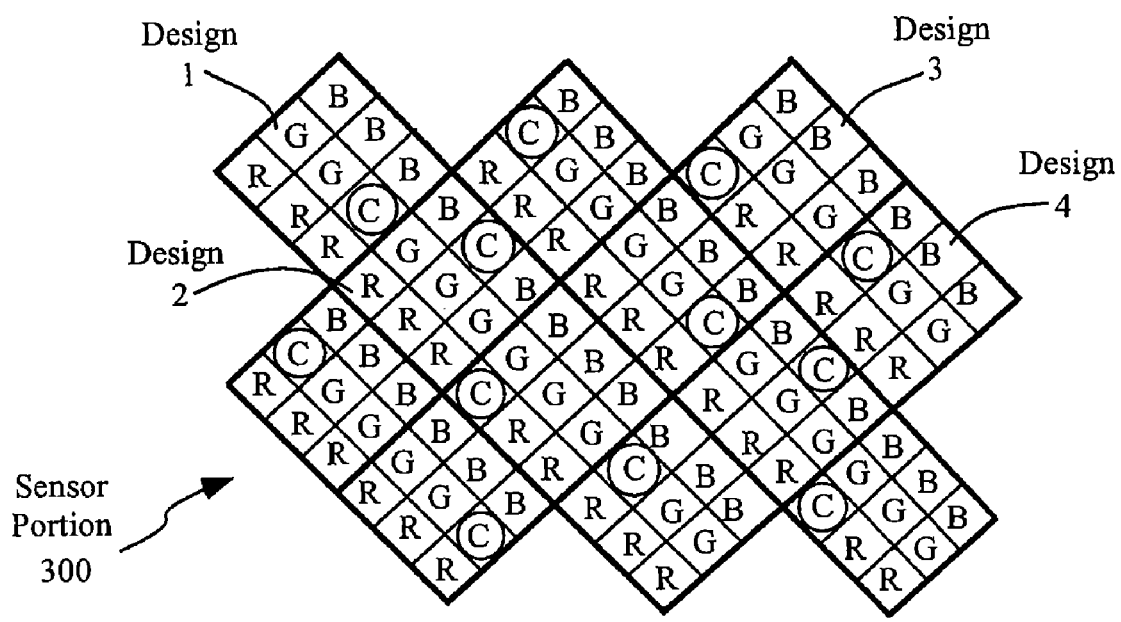
FIG. 3b illustrates the exemplary sensor portion of FIG. 3a in greater detail, showing the four sub-pixel array designs 1, 2, 3 and 4 as 3×3 sub-pixel arrays of R, G, B sub-pixels and one clear sub-pixel in a different location for every design.

FIG. 3b illustrates the exemplary sensor portion 300 of FIG. 3a in greater detail, showing the four sub-pixel array designs 1, 2, 3 and 4 as 3×3 sub-pixel arrays of R, G, B sub-pixels and one clear sub-pixel in a different location for every design. Note that the clear sub-pixel is encircled with thicker lines for visual emphasis only. By having several sub-pixel array designs in the sensor, each sub-pixel array design having clear sub-pixels in different locations, a pseudo-random clear sub-pixel distribution in the imager can be achieved, and unintended low frequency Moire patterns caused by pixel regularity can be reduced. After the color pixel outputs are obtained from a sensor having diagonal sub-pixel arrays, such as the one shown in FIG. 3b, further processing can be performed to interpolate the color pixels and generate other color pixel values to satisfy the display requirements of an orthogonal pixel arrangement.

As mentioned above, each sub-pixel array can produce a color pixel output that is a combination of the outputs of the sub-pixels in the sub-pixel array. In some embodiments of the invention, all sub-pixels can have the same exposure time, and all sub-pixel outputs can be normalized to the same range (e.g. between [0,1]). The final color pixel output can be the combination of all sub-pixels (each sub-pixel type having different response curves).

However, in other embodiments, if a higher dynamic range is desired, the exposure time of individual sub-pixels can be varied (e.g. the clear sub-pixel in a sub-pixel array can be exposed for a longer time, while the color sub-pixels can be exposed for a shorter time). In this manner, even darker areas can be captured, while the regular color sub-pixels exposed for a shorter time can capture even brighter areas.

Figure 4:
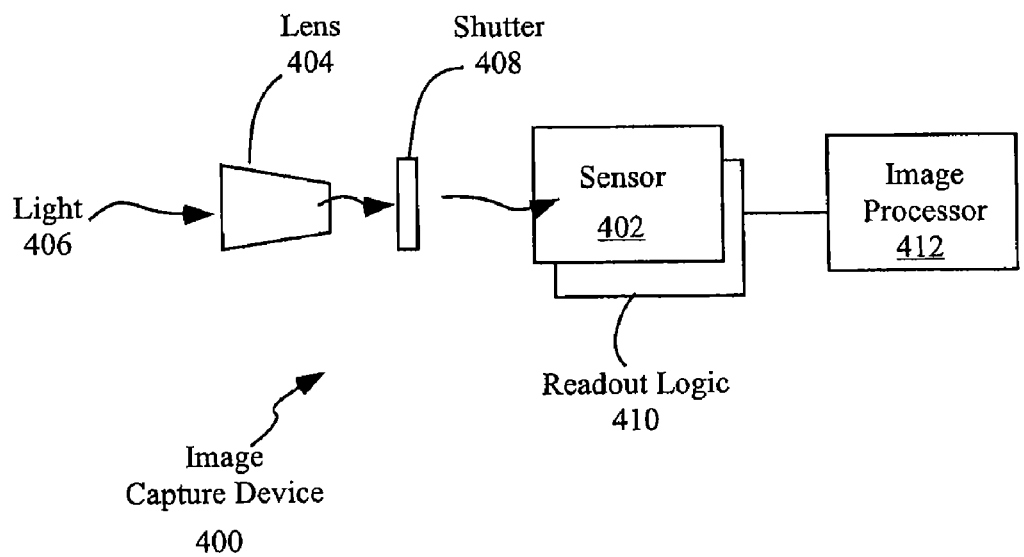
FIG. 4 illustrates an exemplary image capture device including a sensor formed from multiple sub-pixel arrays according to embodiments of the invention.

FIG. 4 illustrates an exemplary image capture device 400 including a sensor 402 formed from multiple sub-pixel arrays according to embodiments of the invention. The image capture device 400 can include a lens 404 through which light 406 can pass. An optional shutter 408 can control the exposure of the sensor 402 to the light 406. Readout logic 410, well-understood by those skilled in the art, can be coupled to the sensor 402 for reading out sub-pixel information and storing it within image processor 412. The image processor 412 can contain memory, a processor, and other logic for performing the normalization, combining, interpolation, and sub-pixel exposure control operations described above.

Figure 5:
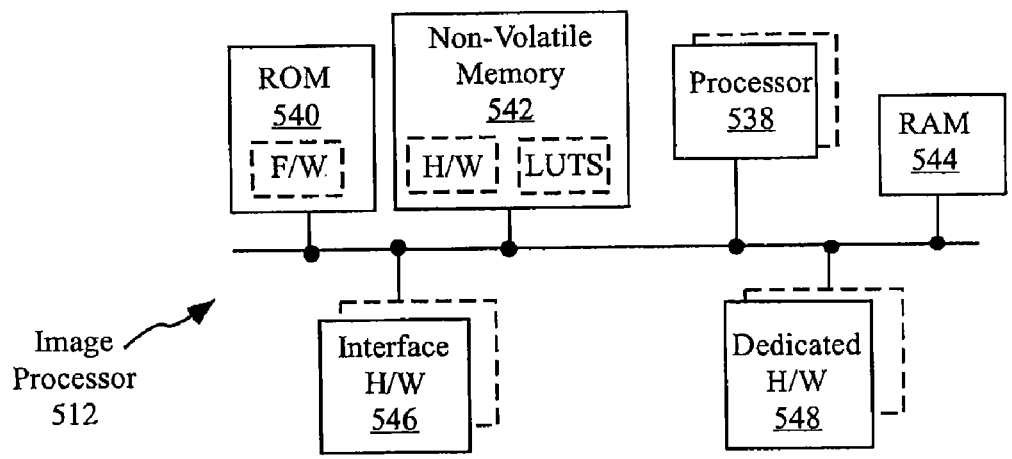
FIG. 5 illustrates a hardware block diagram of an exemplary image processor that can be used with a sensor formed from multiple sub-pixel arrays according to embodiments of the invention.

FIG. 5 illustrates a hardware block diagram of an exemplary image processor 500 that can be used with a sensor formed from multiple sub-pixel arrays according to embodiments of the invention. In FIG. 5, one or more processors 538 can be coupled to read-only memory 540, non-volatile read/write memory 542, and random-access memory 544, which can store boot code, BIOS, firmware, software, and any tables necessary to perform the processing described above. Optionally, one or more hardware interfaces 546 can be connected to the processor 538 and memory devices to communicate with external devices such as PCs, storage devices and the like. Furthermore, one or more dedicated hardware blocks, engines or state machines 548 can also be connected to the processor 538 and memory devices to perform specific processing operations.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An image sensor for generating a plurality of color pixel outputs as components of an image, comprising:
a plurality of sub-pixel arrays, each sub-pixel array configured for generating a different color pixel output, each sub-pixel array having
a plurality of sub-pixels of a first color arranged in a first strip,
a plurality of sub-pixels of a second color arranged in a second strip, and
a plurality of sub-pixels of a third color arranged in a third strip,
wherein the first, second and third strips are aligned with and adjacent to each other to form the sub-pixel array, and
wherein each of the sub-pixels are configured for generating a sub-pixel output that can be combined with other sub-pixel outputs within a single frame to generate the color pixel output,
one or more of the sub-pixel arrays including one or more clear sub-pixels in one or more of the first, second, and third strips, the one or more clear sub-pixels configured for detecting lower light levels than the first, second or third color sub-pixels and enhancing a dynamic range of the sub-pixel array, wherein the plurality of sub-pixel arrays includes a plurality of sub-pixel array designs, each sub-pixel array design having the clear sub-pixel in a different location in the sub-pixel array.

2. The image sensor of claim 1, wherein within each sub-pixel array, the first color sub-pixels are red (R), the second color sub-pixels are green (G), and the third color sub-pixels are blue (B).

3. The image sensor of claim 1, wherein the plurality of sub-pixel array designs are arranged within the image sensor to produce a pseudo-random distribution of clear sub-pixels and reduce Moire patterns.

4. The image sensor of claim 1, wherein each sub-pixel array is arranged in a diagonal orientation for improving visual resolution.

5. The image sensor of claim 1, wherein one or more sub-pixels in one or more sub-pixel arrays are configurable for having a different exposure time than the other sub-pixels in the array.

6. The image sensor of claim 1, the image sensor forming a part of an image capture device.

7. The sub-pixel array of claim 1, wherein the plurality of sub-pixels of the first, second or third colors comprise colors of different shades.

8. An image capture device for generating an image, comprising:
an image sensor for generating a plurality of color pixel outputs as components of an image, the image sensor including a plurality of sub-pixel arrays, each sub-pixel array configured for generating a different color pixel output, each sub-pixel array having
a plurality of sub-pixels of a first color arranged in a first strip,
a plurality of sub-pixels of a second color arranged in a second strip, and
a plurality of sub-pixels of a third color arranged in a third strip,
wherein the first, second and third strips are aligned with and adjacent to each other to form the sub-pixel array, and
wherein each of the sub-pixels are configured for generating a sub-pixel output that can be combined with other sub-pixel outputs within a single frame to generate the color pixel output,
one or more sub-pixel arrays within the image sensor further comprising one or more clear (C) sub-pixels in one or more of the first, second, and third strips, the one or more clear sub-pixels configured for detecting lower light levels than the first, second or third color sub-pixels and enhancing a dynamic range of the sub-pixel array, wherein the image sensor includes a plurality of sub-pixel array designs, each sub-pixel array design having the clear sub-pixel in a different location in the sub-pixel array.

9. The image capture device of claim 8, further comprising an image processor coupled to the image sensor, the image processor programmed for interpolating the color pixel outputs and generating other color pixel values to satisfy display requirements of an orthogonal pixel arrangement.

10. The image capture device of claim 8, wherein within each sub-pixel array in the image sensor, the first color sub-pixels are red (R), the second color sub-pixels are green (G), and the third color sub-pixels are blue (B).

11. The image capture device of claim 8, wherein the plurality of sub-pixel array designs are arranged within the image sensor to produce a pseudo-random distribution of clear sub-pixels and reduce Moire patterns.

12. The image capture device of claim 8, wherein each sub-pixel array in the image sensor is arranged in a diagonal orientation for improving visual resolution.

13. The image capture device of claim 8, wherein one or more sub-pixels in one or more sub-pixel arrays of the image sensor are configurable for having a different exposure time than the other sub-pixels in the array.

14. The image capture device of claim 8, wherein the plurality of sub-pixels of the first, second or third colors comprise colors of different shades.

15. A method for generating a plurality of color pixel outputs as components of an image, comprising:
   forming a plurality of sub-pixel arrays, each sub-pixel array configured for generating a different color pixel output, each sub-pixel array formed by
     arranging a plurality of sub-pixels of a first color in a first strip,
     arranging a plurality of sub-pixels of a second color in a second strip,
     arranging a plurality of sub-pixels of a third color in a third strip, and
     aligning the first, second and third strips adjacent to each other; and
   generating the color pixel output from each sub-pixel array by
     obtaining a sub-pixel output from each sub-pixel within the sub-pixel array, and
     combining the sub-pixel outputs within a single frame to generate the color pixel output;
   forming one or more clear (C) sub-pixels in one or more of the first, second, and third strips of one or more sub-pixel arrays, the one or more clear sub-pixels configured for detecting lower light levels than the first, second or third color sub-pixels and enhancing a dynamic range of the sub-pixel array; and
   utilizing a plurality of sub-pixel array designs to form the plurality of sub-pixel arrays, each sub-pixel array design having the clear sub-pixel in a different location in the sub-pixel array.

16. The method of claim 15, wherein within each sub-pixel array, the first color sub-pixels are red (R), the second color sub-pixels are green (G), and the third color sub-pixels are blue (B).

17. The method of claim 15, further comprising arranging the plurality of sub-pixel array designs to produce a pseudo-random distribution of clear sub-pixels and reduce Moire patterns.

18. The method of claim 15, further comprising arranging each sub-pixel array in a diagonal orientation for improving visual resolution.

19. The method of claim 15, further comprising providing one or more sub-pixels in one or more sub-pixel arrays with a different exposure time as compared to the other sub-pixels in the array.

20. The method of claim 15, further comprising interpolating the color pixel outputs and generating other color pixel values to satisfy display requirements of an orthogonal pixel arrangement.

21. The method of claim 15, wherein the plurality of sub-pixels of the first, second or third colors comprise colors of different shades.

* * * * *